United States Patent
Gupta et al.

(10) Patent No.: US 8,565,977 B2
(45) Date of Patent: Oct. 22, 2013

(54) VEHICLE CONFIGURATION FOR IMPROVING LOW SPEED MANEUVERABILITY

(75) Inventors: Rajiv K. Gupta, Ann Arbor, MI (US); Christopher E. Borroni-Bird, Oakland Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 489 days.

(21) Appl. No.: 12/794,835

(22) Filed: Jun. 7, 2010

(65) Prior Publication Data

US 2010/0324782 A1    Dec. 23, 2010

Related U.S. Application Data

(60) Provisional application No. 61/218,054, filed on Jun. 17, 2009.

(51) Int. Cl.
*G06F 19/00* (2011.01)
(52) U.S. Cl.
USPC .............................................. 701/41; 701/117
(58) Field of Classification Search
USPC ................ 701/41, 117, 31.4; 296/203.01; 340/436, 437; 454/69
See application file for complete search history.

(56) References Cited

U.S. PATENT DOCUMENTS

| | | | |
|---|---|---|---|
| 6,161,071 A * | 12/2000 | Shuman et al. | 701/48 |
| 7,028,791 B2 * | 4/2006 | Chernoff et al. | 180/65.1 |
| 2006/0090438 A1 * | 5/2006 | Hunt et al. | 56/10.2 A |
| 2006/0261212 A1 * | 11/2006 | Feliciano | 244/1 R |
| 2009/0319095 A1 * | 12/2009 | Cech et al. | 701/1 |
| 2010/0106356 A1 * | 4/2010 | Trepagnier et al. | 701/25 |
| 2010/0253593 A1 | 10/2010 | Seder et al. | |

FOREIGN PATENT DOCUMENTS

| | | |
|---|---|---|
| DE | 100 32 994 A1 | 1/2002 |
| DE | 201 07 058 U1 | 10/2002 |
| DE | 10 2005 004 727 A1 | 8/2006 |
| DE | 10 2005004 72 7 * | 8/2006 |
| DE | 10 2005 023 286 A1 | 12/2006 |
| EP | 1 902 926 A1 | 3/2008 |

OTHER PUBLICATIONS

David B. Reister and Michale A. Unseren, Position and Constraint Force Control of a Vehicle with Two or More Steerable Drive Wheels, Dec. 6, 1993, IEEE Transaction on Robotics and Automation, Vol. 9, No. 6 pp. 723-731.*

Andrei M. Shkel and Vladimir J. Lumelsky, Curvature-Constrained Motion Within a Limited Workspace, 1997, Proceeding 1997 IEEE, International Conference on Robotics and Automation, pp. 1394-1399.*

(Continued)

*Primary Examiner* — Marthe Marc-Colleman

(57) ABSTRACT

An apparatus to turn a vehicle in a low speed zero slip turning maneuver includes a vehicle body and a vehicle chassis including a plurality of wheels, wherein every wheel of the chassis is steerable, and an electric propulsion system. The apparatus also includes a low speed turning maneuver module monitoring a desired low speed zero slip turning maneuver, determining a desired instant center of rotation for the vehicle based upon the desired low speed zero slip turning maneuver, determining a wheel orientation for each of the wheels perpendicular to the desired instant center of rotation, and controlling each of the wheels according to the corresponding determined wheel orientation.

14 Claims, 8 Drawing Sheets

(56) References Cited

OTHER PUBLICATIONS

Xu et al., Maneuver Control of Mobile Robot Based on Equivalent Instantaneous Center of Rotation in Rough Terrain, Aug. 5-8, 1007, Proceeding of the 2007 IEEE International Conference on Mechatronics and Automation, Harbin, China,pp. 405-410.*

Caracciolo et al., Trajectory tracking Control of a Four-Wheel Differential Driven Mobile Robot, May 1999, Proceeding of the 1999 IEEE International Concerence on Robotic & Automation, Detroit, Michigan, pp. 2632-2638.*

Jian et al., The Slinding Moded Control Based on Extended State Observer for Skid Steering of 4-Wheel-Drive Electric Vehicle, 2004, Krysztof K. Dariusz. P, "Modeling and Control of a 4-Wheel Skid-Steering Mobile Robot", Int. Appl Math Comput. SC, 2004, vol. 14, No. 4, pp. 477-496.*

* cited by examiner

VEHICLE CONFIGURATION FOR IMPROVING LOW SPEED MANEUVERABILITY

CROSS REFERENCE TO RELATED APPLICATIONS

This application claims the benefit of U.S. Provisional Application No. 61/218,054, filed on Jun. 17, 2009, which is incorporated herein by reference.

TECHNICAL FIELD

This disclosure is related to control of vehicles on a roadway.

BACKGROUND

The statements in this section merely provide background information related to the present disclosure and may not constitute prior art.

Small vehicles optimized for urban traffic are known. Advances in propulsion, energy sources, miniaturization, computerized control, and other fields continue to allow smaller and smaller vehicles to be developed. Small vehicle configurations may be advantageously utilized to increase utilization of urbanized areas.

Small vehicles may be configured for greater maneuverability as compared to conventional vehicles. Parking areas may increase vehicle density based both upon the smaller size of the vehicles and the increased maneuverability. Traffic flow patterns dedicated to smaller vehicles may include more lanes and tighter turns as compared to traffic flow patterns open to conventional traffic.

SUMMARY

An apparatus to turn a vehicle in a low speed zero slip turning maneuver includes a vehicle body and a vehicle chassis including a plurality of wheels, wherein every wheel of the chassis is steerable, and an electric propulsion system. The apparatus also includes a low speed turning maneuver module monitoring a desired low speed zero slip turning maneuver, determining a desired instant center of rotation for the vehicle based upon the desired low speed zero slip turning maneuver, determining a wheel orientation for each of the wheels perpendicular to the desired instant center of rotation, and controlling each of the wheels according to the corresponding determined wheel orientation.

BRIEF DESCRIPTION OF THE DRAWINGS

One or more embodiments will now be described, by way of example, with reference to the accompanying drawings, in which.

DETAILED DESCRIPTION

Figure 1:
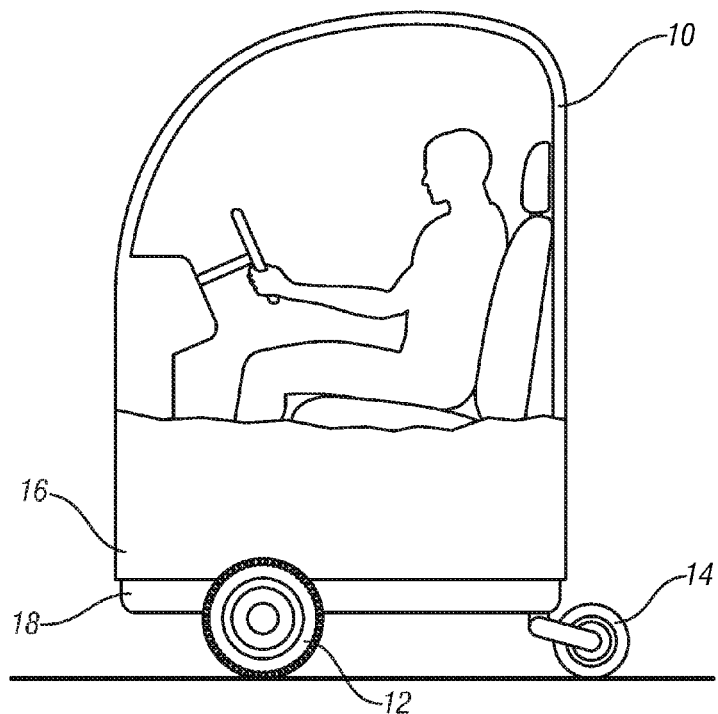
FIG. 1 illustrates an exemplary host vehicle adapted for urbanized traffic, in accordance with the present disclosure.

Referring now to the drawings, wherein the showings are for the purpose of illustrating certain exemplary embodiments only and not for the purpose of limiting the same, FIG. 1 illustrates an exemplary host vehicle optimized for urbanized traffic, in accordance with the present disclosure. Vehicle 10 comprises a body 16 attached to a chassis 18. Chassis 18 includes a plurality of wheels, including a wheel 12 and a second wheel 14. In the exemplary configuration of vehicle 10, wheel 12 includes a wheel with a greater diameter than the diameter of wheel 14. In the exemplary configuration of vehicle 10, wheel 14 extends rearward of the vehicle and may be turned in accordance with steering control of vehicle 10. Wheel 12 is located in a forward portion of the chassis 18. Wheel 12 and wheel 14 are longitudinally located with respect to the chassis based upon factors known in the art including braking performance, acceleration performance, cornering performance, drivability or factors affecting the operator's perception of the performance of the vehicle, and other similar factors. Body 16 is depicted situated atop chassis 18 and includes accommodations for at least one occupant. Body 16 is shown in cutaway section, showing a lower outer surface and cutting above into a section showing an operator seated and operating controls for vehicle 10. The profile of body 16 is preferably configured to include an ergonomically comfortable passenger compartment but with minimal excess structure in order to maximize the urban utility described herein. Exemplary body configurations seating two occupants have been designed to fit within a package space defined by a cylinder. Such exemplary designs have been, for example, configured with outer body diameters according to a cylinder with a diameter of 1736 mm, another to a cylinder with a diameter of 1609 mm, and another to a cylinder with a diameter of 1565 mm.

Figure 2:
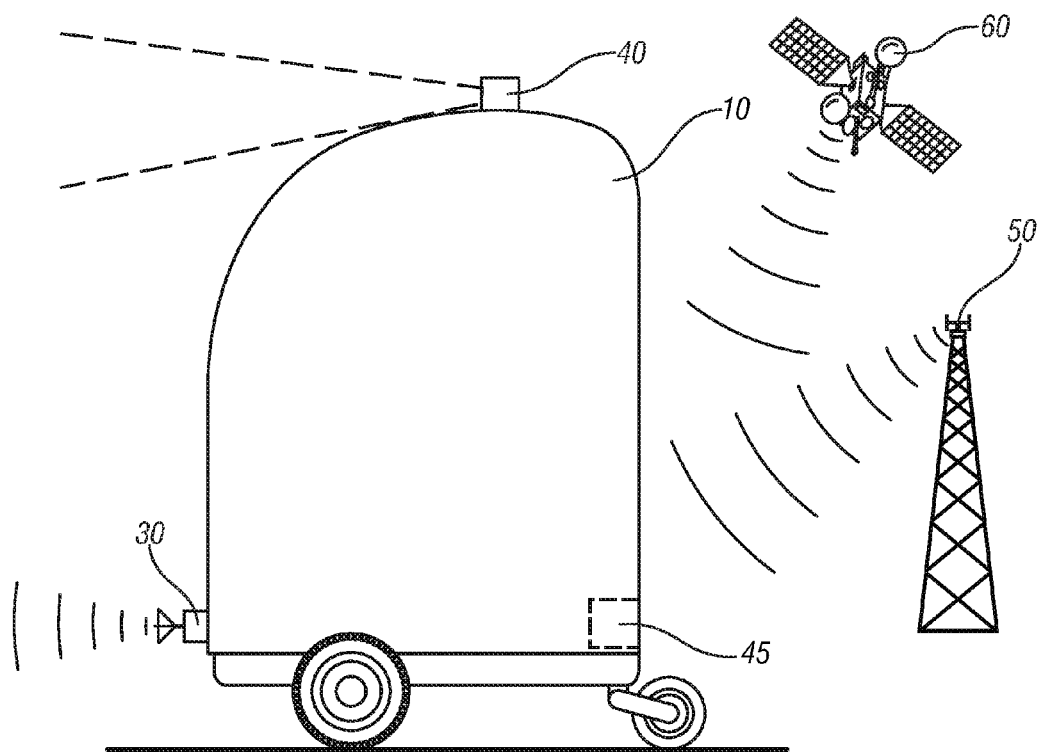
FIG. 2 illustrates the exemplary host vehicle including a number of devices useful to control the host vehicle, in accordance with the present disclosure.

FIG. 2 illustrates the exemplary host vehicle including a number of devices useful to control the host vehicle in accordance with the present disclosure. Host vehicle 10 includes exemplary sensor devices including a radar system 30 and a camera system 40. Additionally, host vehicle 10 receives signals from remote wireless communications system 50 and remote satellite system 60 through communication device 45. Host vehicle 10 monitors and processes available information from the aforementioned systems, including information on target vehicle 20, the road surface being driven upon, and other information available from the remote systems for the purpose of facilitating control of host vehicle 10.

Sensor data and other information may be used in various applications to implement autonomous or semi-autonomous control of the vehicle. For example, adaptive cruise control (ACC) is known wherein a vehicle monitors a range to a target vehicle and controls vehicle speed in order to maintain a minimum range to the target vehicle. Lane keeping methods utilize available information to predict and respond to a vehicle unexpectedly crossing a lane boundary. Object tracking methods monitor objects in the operating environment of the vehicle and facilitate reactions to the object tracks. Lateral vehicle control is known wherein information related to a projected clear path, lane keeping boundary, or potential for collision is utilized to steer the vehicle. Lateral vehicle control may be used to implement lane changes, and sensor data may be used to check adjacent lanes for availability. Collision avoidance systems or collision preparation systems are known, wherein information is monitored and utilized to predict a likelihood of collision. Actions are taken in the event the predicted likelihood of collision exceeds a threshold. A number of methods, for example as disclosed in co-pending and commonly assigned U.S. patent application Ser. No. 12/417,077, and incorporated herein by reference, permits operation of a vehicle by autonomous and semi-autonomous control. Many forms of autonomous and semi-autonomous control are known, and the disclosure is not intended to be limited to the particular exemplary embodiments described herein.

Figure 3:
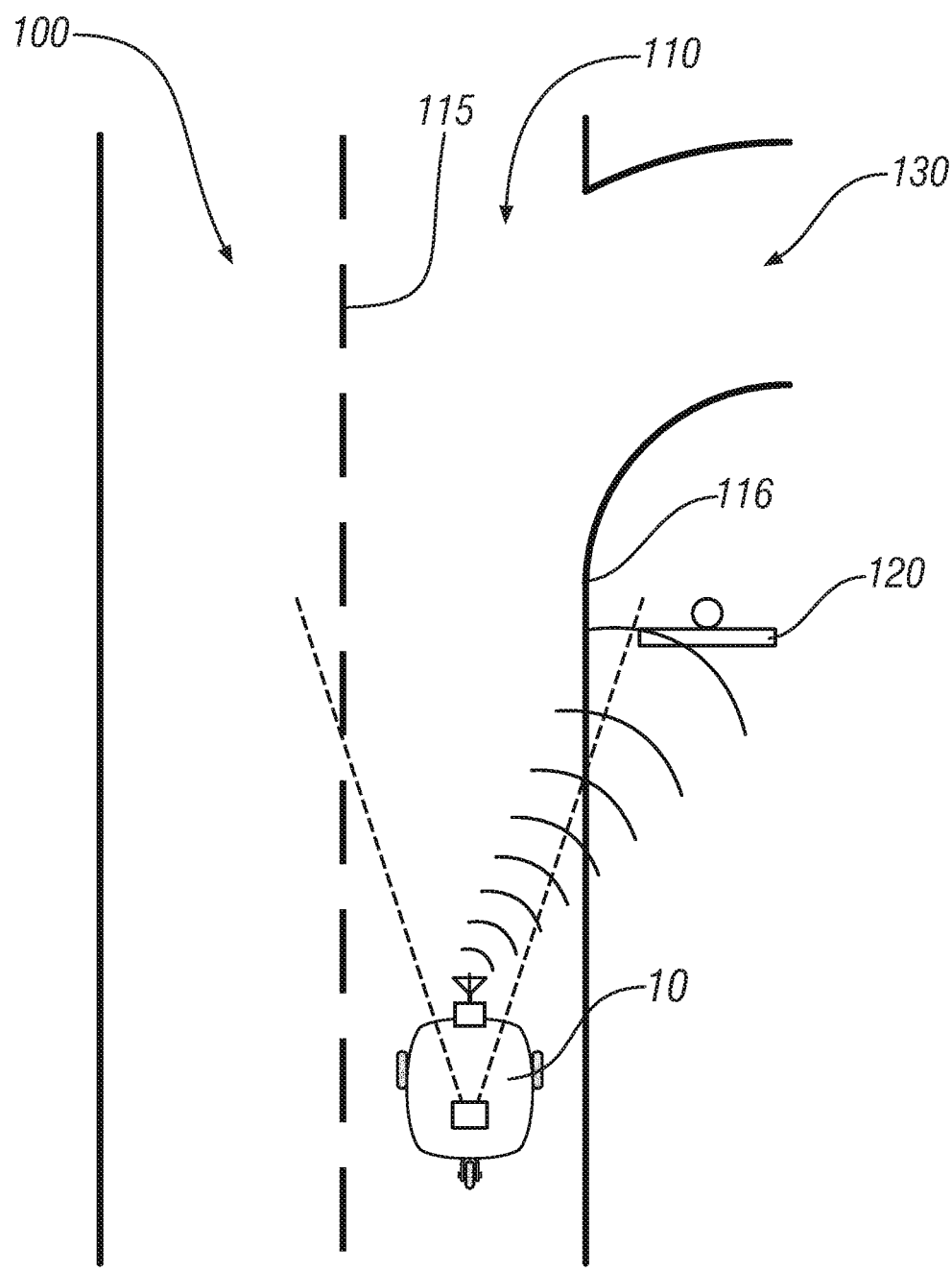
FIG. 3 illustrates an exemplary host vehicle on a stretch of road utilizing a number of different inputs that may be utilized to locate the vehicle, in accordance with the present disclosure.

Multiple sources of information may be utilized in coordination to control a host vehicle. FIG. 3 illustrates an exemplary host vehicle on a stretch of road utilizing a number of different inputs that may be utilized to locate the vehicle, in accordance with the present disclosure. Host vehicle 10 is traveling on road surface 100 in lane 110 defined by lane markers 115 and 116. Host vehicle 10 monitors inputs from various sensors, which may include data from radar system 30, vision data from camera system 40, and GPS and internet available information from communications device 45. Information over a wireless network from such a transmitter tower may be used as information for host vehicle 10, for example, relaying traffic, weather, localizing signals, GPS offset signals or other information to the vehicle. In one particular form of communication, known as vehicle to infrastructure or V2I communication, information over a wireless connection may be exchanged between a vehicle and an infrastructure device, enabling communication of information related to travel in a particular region or control of the vehicle according to infrastructure commands. Such V2I communication is useful in coordinating vehicular traffic in dense areas, in parking areas, in formations useful to efficient travel, in coordinated traffic signal schemes, and other similar applications. Similarly, GPS signals may be utilized to provide location, orientation, or other useful information to the vehicle. Radar returns may provide useful information regarding the location of the vehicle and the presence of target objects in the area surrounding the vehicle, for example, allowing tracking of target vehicles in nearby lanes of travel. In another example, sign post 120 is depicted. Such a return, utilized in conjunction with a known location of the sign on a map or coordinated with historical data from historical travel past the sign, may be used to localize the vehicle location upon road surface 100. A camera view or analysis of camera images may likewise be utilized to localize the vehicle location. For example, camera images of sign post 120, lane markers 115 and 116, or occurrence of an off-ramp 130 in combination with information regarding location of these features with respect to road surface 100 allow for improved estimation of vehicle location upon road surface 100. Camera data may similarly be used to evaluate the presence of other vehicles, pedestrian traffic, obstacles in the roadway, the presence or absence of a clear path in front of the vehicle, or other similar uses.

Figure 4:
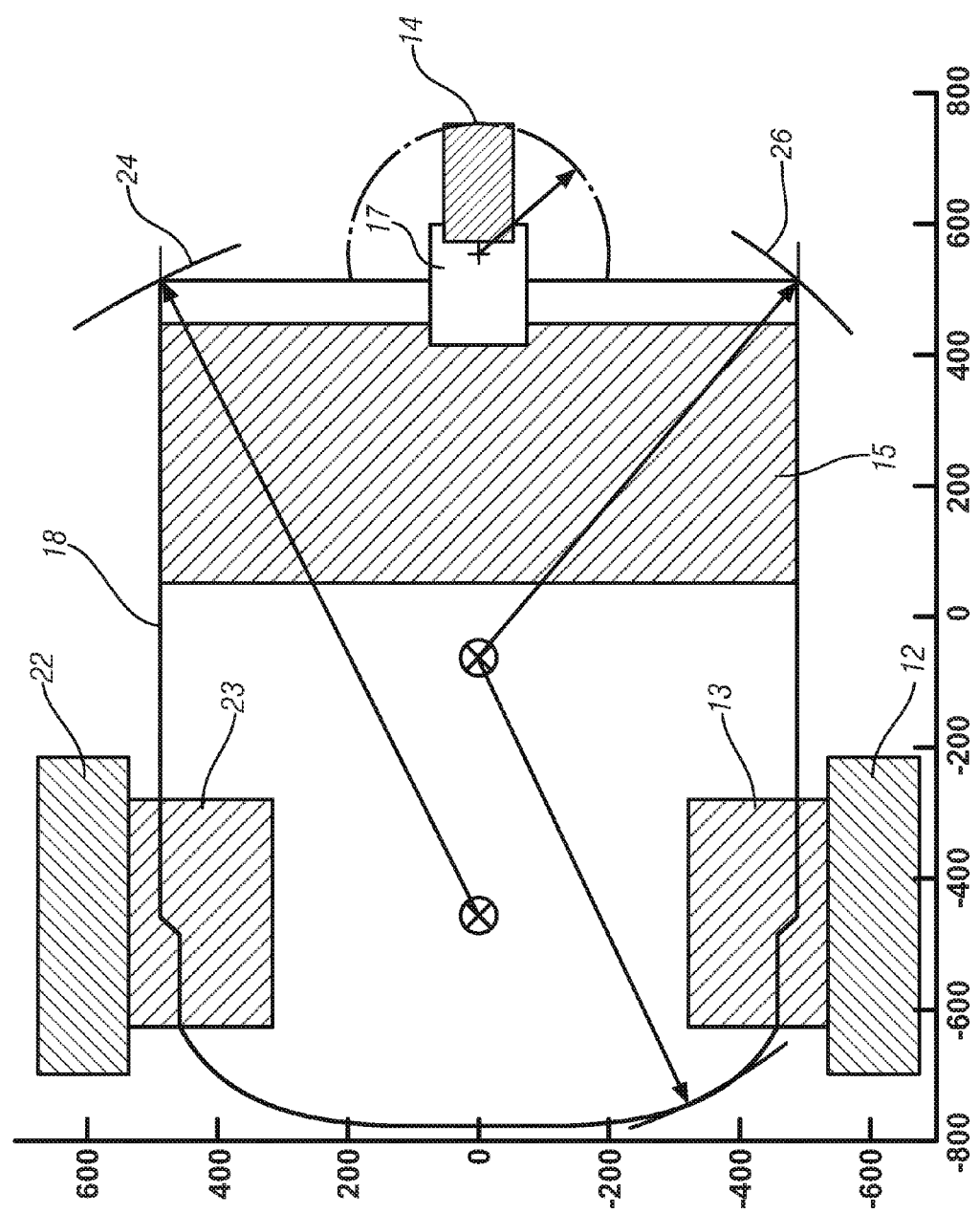
FIG. 4 depicts an exemplary chassis configuration, in accordance with the present disclosure.

FIG. 4 depicts an exemplary chassis configuration in accordance with the present disclosure. This exemplary configuration describes geometric relationships that may be utilized to accomplish a chassis in accordance with the present disclosure. However, it will be appreciated that a wide number of variations may exist in chassis configurations, and the disclosure is not intended to be limited to the particular embodiment described herein. As described in FIG. 1, exemplary chassis 18 is a flat section of vehicle 10, upon which body 16 sits. According to one exemplary embodiment, the chassis and the body may be maintained as modular package volumes, for example, with a plane, a plurality of planar surfaces, or a defined surface separating the body and the chassis. Such an exemplary configuration permits maximization of space available to the passenger compartment while maintaining a small overall size to the vehicle, enabling the tight turning methods described herein. Wheels 12 and 22 are depicted, comprising a first row of wheels. An exemplary tire size is given as P140/70R12. Alternative wheel configurations are envisioned utilizing 10 inch tires. Wheel 14 is likewise depicted, comprising one exemplary possible configuration. An exemplary 8 inch tire (with a 2.8 inch width) is depicted for the rear wheel. Component pack 13 is depicted connected to wheel 12, and includes devices and systems known in the art to accomplish at-wheel motor propulsion, vehicle braking, vehicle suspension functions, and potentially front wheel steering, in accordance with methods described herein. Similarly component pack 23 is depicted connected to wheel 22. Rear wheel steering mechanism 17 is depicted, connected to and controlling the rotational orientation of wheel 14. Additionally, region 15 is depicted wherein batteries, electronics, and other vehicular systems may be located. An exemplary battery box may be utilized in region 15, for example, with dimensions of 400 mm×980 mm×(2×100 mm).

With an instant center of rotation located coincident with the center a row of wheels defined by wheels 12 and 22, a spin envelope radius 24 or wall to wall turn radius of 1068 mm may be described for the depicted configuration from the instant center of rotation to a farthest edge of the chassis. It will be appreciated that changing the instant center of rotation to a different location may change the wall to wall turn radius for the vehicle. Another instant center of rotation is depicted, describing a location equidistant from corners at the rear of the chassis and a farthest front edge of the chassis. The resulting wall to wall turn radius 26 is shorter than 1068 mm, describing an improved turning radius for the vehicle.

In configuring chassis 18, other considerations must be made for the overall dimensions of the chassis. For example, the height of the chassis affects the resulting height of the vehicle, which may affect vehicle operational characteristics. Further, chassis height may affect the height to which an occupant must climb into the vehicle upon entering the vehicle. Width of the wheels and the wheel base of the vehicle are factors to vehicle operational characteristic. Clearance to the ground provided by the wheels and suspension of the vehicle provide one characteristic to vehicle operation. Width and length of the chassis affects passenger room and cargo capacity. Similar chassis dimensions must be considered according to vehicle criteria known in the art.

With respect to the location and configuration of region 15, it will be appreciated that distribution of weight in a vehicle and the resulting center of mass of the vehicle affects a number of vehicle operational characteristics. For example, center of gravity affects steering, braking, stability, and other similar characteristics. Placement of batteries and electronics in region 15 within chassis 18 may assist in lowering the center of gravity of the vehicle, therefore improving stability of the vehicle in a vertical direction. However, this vertical stability must be balanced with other operational concerns in order to affect desired vehicle operation. Wheel 14 and connective mechanisms thereto include devices and systems similar to those found in component packs 13 and 23, performing functions such as braking, steering, and suspension functions known in the art.

Figure 5:
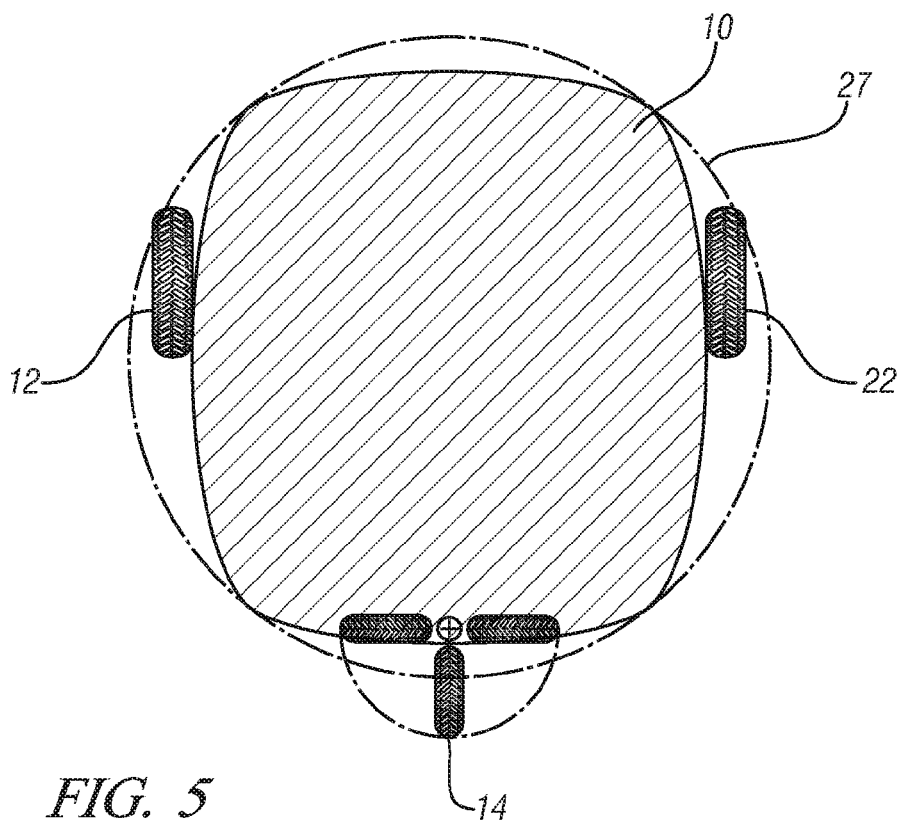
FIG. 5 depicts an overhead view of an exemplary vehicle with three wheels, in accordance with the present disclosure.

FIG. 5 depicts an overhead view of an exemplary vehicle with three wheels, in accordance with the present disclosure. Vehicle 10 comprises wheels 12, 22, and 14. An ideal spin envelope 27 is depicted, describing a circular region though which the body and chassis may rotate if the vehicle were spun through an ideal geometric center of the vehicle. It is noted that in some configurations, the wheels might extend outward from the ideal spin envelope 27 defined by the body of the vehicle, and any control methods utilized to guide the vehicle would need to take the locations of the wheels into account.

Figure 6:
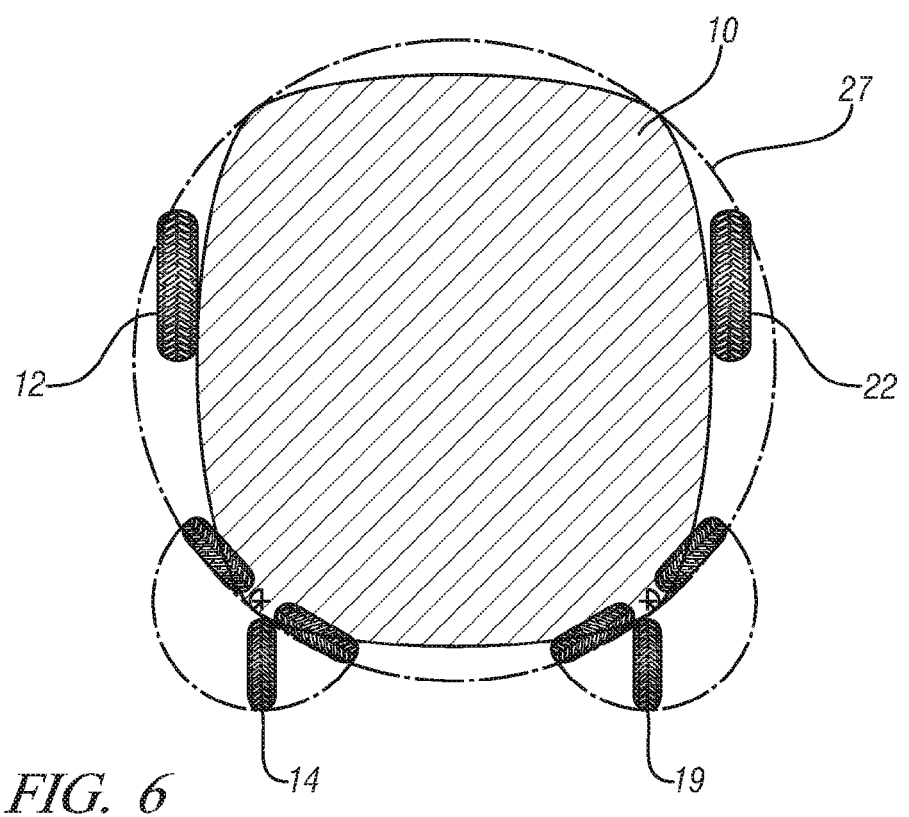
FIG. 6 depicts an overhead view of an exemplary vehicle with four wheels, in accordance with the present disclosure.

FIG. 6 depicts an overhead view of an exemplary vehicle with four wheels, in accordance with the present disclosure. In this embodiment, vehicle 10 comprises wheels 12, 22, 14 and 19. It will be appreciated that wheels 14 and 19 are cooperatively controlled to effect control of the vehicle, for example, with each rear wheel getting a separate rear wheel steering mechanism controlled by a single steering module. Such a four wheel configuration may achieve improved stability over the above described three wheel design.

The example configuration of FIG. 6 may be turned according to the ideal spin envelope 27, as depicted, with wheels 12 and 22 oriented longitudinally. However, such an orientation would necessarily include slip between the wheels and the road underneath and would include drivability issues associated with wheels 12 and 22 providing longitudinally oriented motive force while the turning vehicle would be pulling the wheels radially around in the orientation of the spin envelope. Operating a vehicle without tire slip or substantial relative movement between the tire and the road requires that the wheel be oriented in the direction of movement of the vehicle at the location of the wheel. When a vehicle is traveling in a straight and forward direction, wheels oriented in the direction of movement are oriented along the longitudinal axis of the vehicle. When a vehicle is in a zero slip turn, wheels are preferentially turned to be perpendicular to an instant center of rotation for the vehicle or a point describing the turn radius of the vehicle. Small deviances from this perpendicular orientation are allowable, for example, in rear wheels of a conventional vehicle, wherein the relative movement between the tire and the road are minimal. However, in case such as described herein where a vehicle is substantially spinning about an instant center of rotation, orienting the wheels to the direction of movement of the vehicle at the location of the wheel is desirable for vehicle control. However, references herein to a zero slip turning maneuver are understood to reference a method to orient the wheels of the vehicle with respect to an instant center of rotation and do not in any way limit such a turning maneuver with regards to a small amount of relative motion between the wheels of the vehicle and the roadway.

Figure 7:
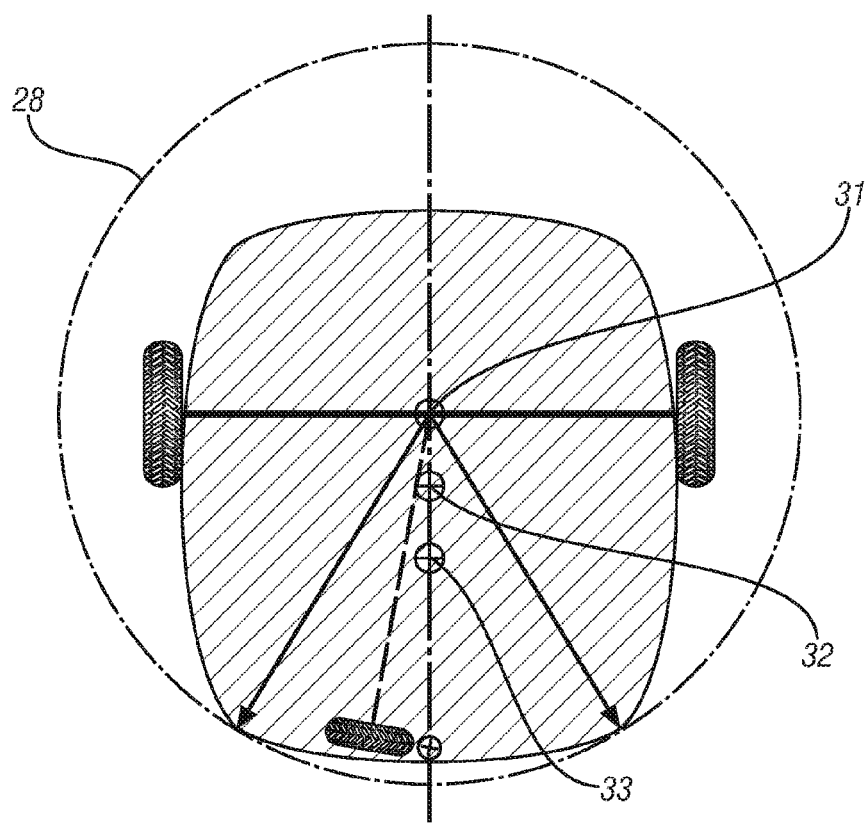
FIG. 7 depicts rotation of an exemplary vehicle about an instant center of rotation coincident with a center of a front row of wheels, in accordance with the present disclosure.

FIG. 7 depicts rotation of an exemplary vehicle about an instant center of rotation coincident with a center of a front row of wheels, in accordance with the present disclosure. As described above, the vehicle is preferentially rotated such that the instant center of rotation is perpendicular to all of the wheels of the vehicle. The exemplary configuration of the vehicle depicted describes the front row of wheels oriented along the longitudinal axis of the vehicle, resulting in an instant center of rotation 31 directly between the front wheels. This orientation of the wheels may be a result of the wheels being fixed in that orientation or as a result of a front wheel steering mechanism at each wheel being controlled to that orientation. Additionally, a rear wheel is depicted oriented to be perpendicular to the instant center of rotation 31. The spin envelope 28 of the vehicle may be determined by a radius from the instant center of rotation 31 to a farthest point or points on the body or chassis. As depicted in FIG. 7, in configurations wherein the instant center of rotation 31 is not located substantially at a geometric center of the vehicle 32, the resulting spin envelope 28 includes a region larger than the geometric outline of the vehicle. Additionally, the center of gravity 33 for the vehicle is depicted, describing a net result of mass distribution throughout the vehicle. The location of the center of gravity 33 and the relative location of the center of gravity 33 to the instant center of rotation 31 are important characteristics to operation of the vehicle.

Figure 8:
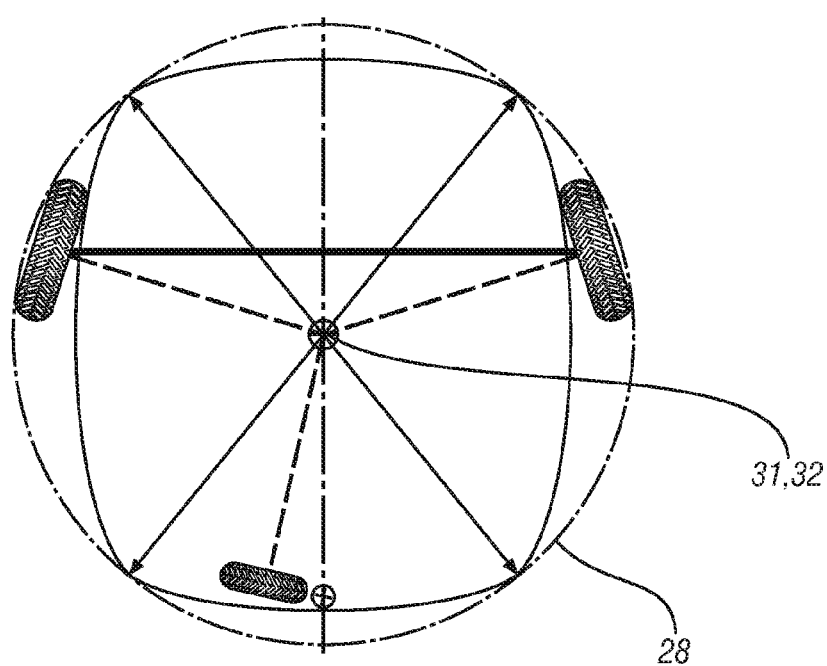
FIG. 8 depicts rotation of an exemplary vehicle about an instant center of rotation coincident with a geometric center of the vehicle, in accordance with the present disclosure.

FIG. 8 depicts rotation of an exemplary vehicle about an instant center of rotation coincident with a geometric center of the vehicle, in accordance with the present disclosure. The exemplary configuration of the vehicle depicted describes the front row of wheels with the forward portions of the wheels oriented inwards in a "toed in" configuration. Operating vehicle wheels in such a non-parallel, toed in configuration allows the vehicle to rotate around a moveable instant center of rotation 31. This toed in configuration allows the instant center of rotation 31 for the vehicle, preferentially located perpendicularly to the orientation of the wheels, to be located rearward in the vehicle as compared to the instant center of rotation 31 described in FIG. 7. Depending upon the resulting location of the instant center of rotation 31, a smaller resulting spin envelope 28 may be controlled to allow the vehicle to rotate in a smaller area. Such a small spin envelope 28 allows the vehicle to maneuver in congested or urbanized setting in ways that known vehicle configurations cannot. By locating the instant center of rotation 31 at the geometric center 32 of the vehicle, a spin envelope 28 limited only by the dimensions of the vehicle may be utilized. Such a maneuver may be selected as a desired stationary rotation of the vehicle. By configuring a vehicle body and chassis with a controlled cylinder-shaped package size or a size with lateral and longitudinal dimensions dispersed widely within a horizontal circle and configuring the wheels of the vehicle such that the vehicle may be rotated around the center of the cylinder or circle, a resulting spin envelope 28 maximizing the horizontal cross-sectional volume of the vehicle while maintaining a minimum turn footprint corresponding to the cylinder-shape or circle may be accomplished.

Such a body and chassis design, corresponding to a cylinder-shape package size, may be described by the vehicle depicted in FIG. 8. From a selected geometric center 32 of the vehicle, the overhead view of the vehicle shows that the body 16 and chassis 18 are sized such that points of extreme radius from the geometric center may be described by a common radius term to the depicted spin envelope 28. In one method to design to this configuration, one may determine the required package space needed for the occupants of the vehicle, create a minimally sized passenger cabin around the required package space for the occupants, including structural and functional considerations known in the art, and create a chassis with a commonly located or smaller outline to fit under the body and including devices and systems for propulsive force, energy storage, vehicle control, and other vehicular functions.

Figure 9:
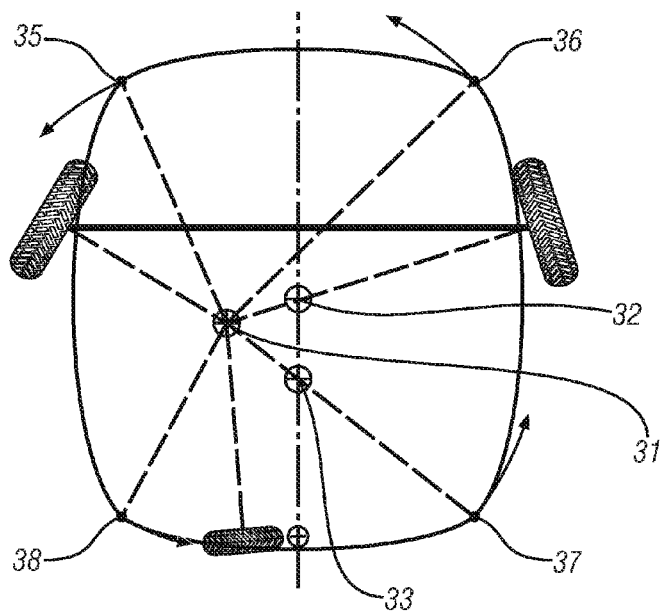
FIG. 9 depicts rotation of an exemplary vehicle about an instant center of rotation adjusted both laterally and longitudinally, in accordance with the present disclosure.

As described above, the instant center of rotation 31 may be controlled to change the rotation and resulting spin envelope 28 of the vehicle. FIG. 8 describes how the instant center of rotation 31 may be adjusted longitudinally in the vehicle. FIG. 9 depicts rotation of an exemplary vehicle about an instant center of rotation adjusted both laterally and longitudinally, in accordance with the present disclosure. As described above, wheel orientations may be adjusted to control the resulting instant center of rotation 31 for the vehicle, with the instant center of rotation 31 being located at a point perpendicular to the wheel orientations. The wheels of the vehicle depicted in FIG. 9 are oriented such that a resulting instant center of rotation 31 is located to the left and rearward of the depicted geometric center 32 of the vehicle. Center of gravity 33 is additionally depicted. Such an instant center of rotation 31 may be picked for the resulting turning motion that the vehicle will execute in a turn. For example, if it is known that the vehicle is close to an object on one side, an instant center of rotation 31 may be selected to ensure that rotation of the vehicle will gain clearance from the object through the rotation. FIG. 9 shows points 35, 36, 37, and 38 and depicts arrows describing movement of the points through a rotation based upon the depicted instant center of rotation. As is evident in the figure, all of the points move radially around the instant center of rotation 31. Knowing this behavior, the operator of the vehicle or a control process, determining the object to be avoided or the path to be followed, may select a desired location of the instant center of rotation and control the orientation of the wheels to match the desired location of the instant center of rotation.

In addition to setting the instant center of rotation 31 based upon an object to be avoided or a path to be followed, a determination may be made according to the center of gravity 33 of the vehicle and the instant center of rotation 31 may be adjusted accordingly. Such an adjustment of the vehicle to rotate about the center of gravity 33 could have a number of benefits. For example, one having skill in the art will appreciate that energy efficiency may be realized by rotating the vehicle about the center of gravity 33. The center of gravity 33 may be a static coordinate in the vehicle estimated based upon an unloaded vehicle. In the alternative, the center of gravity 33 may be estimated based upon occupancy, for example, with seat sensors describing the presence of one or two operators. In the alternative, a center of gravity 33 for a vehicle may be determined dynamically, for example, by measuring operational characteristics of the vehicle in motion and adjusting an initial estimated center of gravity 33 according to the measured operational characteristics. In the alternative, the instant center of rotation 31 for a vehicle may be adjusted based upon the comfort of the occupants of the vehicle, for example, setting the instant center of rotation 31 as closely as possible to the center of the occupant or occupants in order to reduce the perceived force of acceleration experienced by the operator through the rotation of the vehicle. For example, if one occupant is detected in the vehicle, the vehicle may be set to rotate about the center of the seat of the occupant, thereby reducing or eliminating the perception of the occupant of being pushed toward one side of the vehicle if the instant center of rotation 31 were located at some point distant from the occupant.

Figure 10:
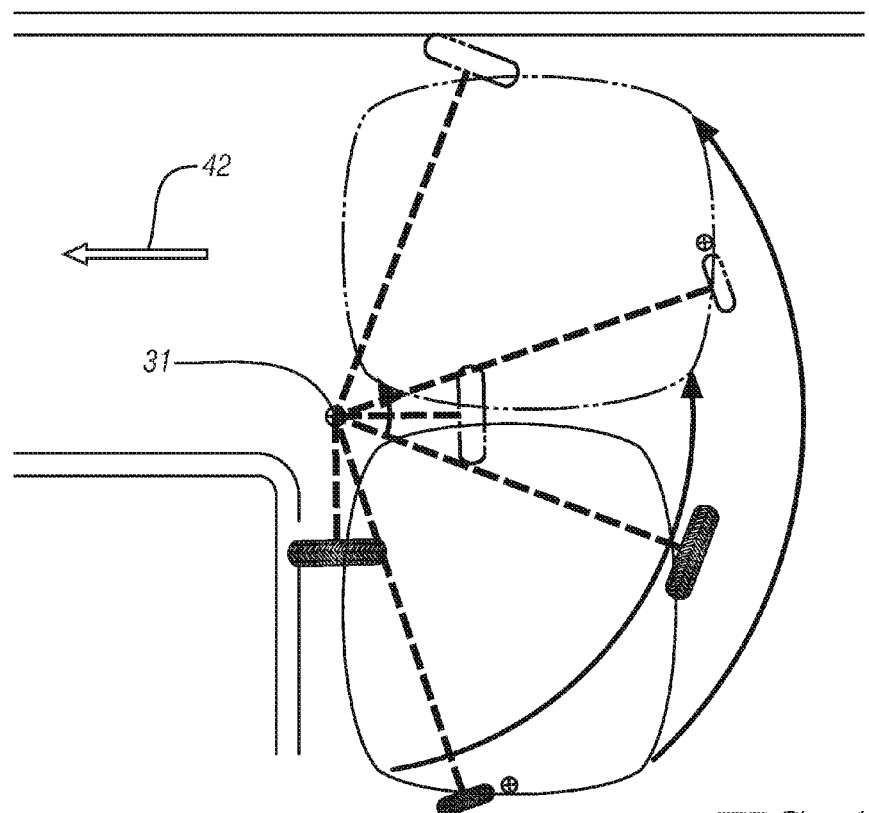
FIG. 10 depicts an exemplary vehicle executing a turn based upon an instant center of rotation located outside of the vehicle outline, in accordance with the present disclosure.

FIG. 9 depicts an instant center of rotation 31 moved both laterally and longitudinally in the vehicle to control a desired motion of the vehicle. Depending upon the angle to which the various wheels in the vehicle may be oriented, the instant center of rotation 31 in a vehicle may be controlled to locations outside of the vehicle to affect unconventional turning maneuvers not possible with conventional wheel configurations. FIG. 10 depicts an exemplary vehicle executing a turn based upon an instant center of rotation located outside of the vehicle outline, in accordance with the present disclosure. The vehicle is depicted with wheels oriented such that a resulting instant center of rotation 31 is located to the front and left of the vehicle. The rotation of this vehicle with such an instant center of rotation 31 swings the rear of the vehicle to the right. As a result, the vehicle may be aligned to a desired lane of travel through the depicted unconventional turning maneuver, for example, utilizing available room to the right of the vehicle while maintaining clearance from objects to the left of the vehicle. Such a turning maneuver, depending upon the dimensions of the vehicle, could additionally offer a thinner profile of the vehicle to the intersection of the lanes through the maneuver than would a vehicle entering the intersection and rotating according to the spin envelope depicted, for example, in FIG. 8.

The aforementioned examples describe vehicles maintaining a desired location of an instant center of rotation through a rotation or turning maneuver. However, it will be appreciated that the location of the instant center of rotation may be dynamically changed through a turning maneuver. For example, a vehicle may be located in a situation wherein a plurality of turns and obstacles are present, and different turning maneuvers may be desirable through different portions of the overall maneuver based upon the different turns and obstacles that need to be navigated. Further, conditions and the locations of obstacles may be dynamic during a period of the vehicle traversing through a maneuver. Through the overall maneuver, the wheels of the vehicle may be dynamically oriented based upon the current turning maneuver that is required.

The methods disclosed herein improve low speed maneuverability of a vehicle by significantly reducing the minimum turn circle diameter compared to other vehicle configurations. These methods allow for vehicles to achieve a continuous turn circle all the way down to the geometrically determined minimum turn circle. The maneuverability of a vehicle is improved by increasing the turning velocity or yaw rate independently of the longitudinal velocity of the vehicle. This independence allows for unique vehicle path following capabilities. For example, a vehicle equipped according to this disclosure may turn one hundred eighty degrees without any forward or rearward motion. Another example is related to vehicle path management during a collision to minimize the overall absorbed energy by converting longitudinal motion to rotational motion along a path of least resistance.

During operation of the vehicle, a desired low speed zero slip turning maneuver may be monitored and utilized to control the vehicle according to the methods described herein. Such a desired low speed zero slip turning maneuver may be determined according to a number of methods. For example, a desired low speed zero slip turning maneuver may be initiated based upon a manual turn command when the vehicle speed is below a threshold, indicating an acute desire by the vehicle operator to make a tight turn. Such a low speed zero slip maneuver based upon a manual indication may include a low speed zero slip turning maneuver mode that may be selectively enabled or disabled by the operator. According to another example, a desired low speed zero slip turning maneuver may be determined as part of a projected path of travel for the vehicle. As described above, methods of autonomous and semi-autonomous control of a vehicle are known. Such methods may yield a projected path of the vehicle through some foreseeable time or travel distance. Turn radii and obstacles to be avoided may be initially plotted and dynamically updated as the vehicle progresses through the projected path of travel. A desired low speed zero slip turning maneuver may be selected as part of generating the projected path of travel, for example, if an exceptionally tight turn is required or if only a tight space is available for the vehicle to traverse through. As part of determining a projected path of travel, a desired vehicle travel envelope may be projected describing a footprint that the vehicle will occupy through the projected path of travel, for example taking into account the geometry of the vehicle and expected turning maneuvers through the projected path of travel. In the alternative, a plurality of candidate vehicle travel envelopes may be determined and selected from to describe the desired vehicle travel envelope for a projected path of travel. Through a desired vehicle travel envelope, corresponding desired instant centers of rotation along the projected path of travel may be plotted and corresponding desired low speed zero slip turning maneuvers may be plotted along the projected path of travel. A number of embodiments to determine a desired low speed zero slip turning maneuver are envisioned, and the disclosure is not intended to be limited to the particular exemplary embodiments described herein.

Movement of vehicles according to a desired location of an instant center of rotation may be useful to optimizing space in an urbanized setting. For example, it may be desirable in an urbanized setting to closely park vehicles in a parking facility. By controlling the instant center of rotation in vehicles, turning maneuvers within the parking facility may be made in the parking structure greatly reducing the need for wide lanes of travel in the structure. Additionally, automated or semi-automated control of vehicles within the structure may beneficially navigate vehicles through densely packed formations of vehicles within the parking facility. V2I communications may allow for autonomous shifting of vehicles within the structure even while the operator is away from the vehicle in order to accommodate dense parking formations within the facility. In such maneuvers, the controlling programming within the structure could shift vehicles around according to their instant centers of rotation, for example, to allow removal of a vehicle initially blocked in a location within a formation.

Figure 11:
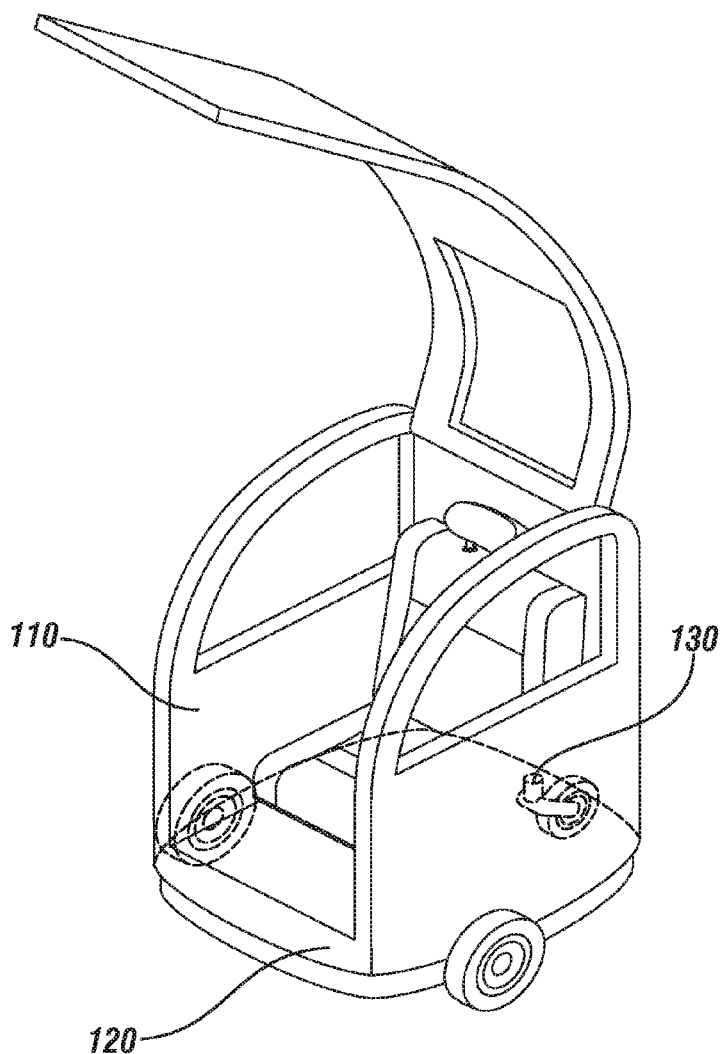
FIG. 11 depicts an embodiment of a door configuration of an exemplary vehicle, with ingress and egress through the front of the vehicle, in accordance with the present disclosure.

Utilization of a chassis as described in association with FIG. 4 allows for a number of ingress and egress options for the vehicle. For example, a typical door configuration may be utilized, with door shapes selected to avoid contact with wheels 12 and 22, wherein the door hinges are located along a front vertical edge of the vehicle. In an alternate embodiment, door hinges may be located along an upper edge of the sides of the vehicle, with the doors opening up and away from the vehicle. FIG. 11 depicts an embodiment of a door configuration of an exemplary vehicle, with ingress and egress through the front of the vehicle, in accordance with the present disclosure. The depicted door configuration includes a hinge located at the top of the door connecting to the top and rearward portion of the body of the vehicle. A windscreen for the occupants of the vehicle to view the area in front of the vehicle is included in the depicted door. Such a configuration may allow an occupant easier access to the seats of the vehicle than standard door configurations. Further, the methods to rotate a vehicle described above allow for the vehicle to be easily parked facing toward the curbside or direction of intended direction of travel of the exiting occupant.

The methods described herein may be manually executable by an operator or automatically controlled by programming either within the vehicle or as part of an infrastructure system. Manual execution by the operator may take many forms. For example, a vehicle may operate by default to turn with fixed front wheels, but an operator may be presented with a selectable "tight turning mode" to program an adjustment to the orientation of the vehicle at stopped or parking turns. In the alternative, a visual display may allow the operator to configure a default spin envelope. In the alternative, the vehicle may utilize programming and vehicle sensors to locate proximate conditions and objects around the vehicle to suggest turning maneuvers and wheel configurations to the operator for selections. Automated parking and departure programs may be operated to select turning maneuvers for the operator based upon sensed vehicle location and proximate conditions and objects around the vehicle. V2I communications may be utilized in a number of situations to allow a remote controller device to coordinate the movement of a vehicle around known obstacles or traffic patterns or various vehicles with respect to each other.

The above described vehicle may utilize a number of human interface device configurations, depending upon the particular requirements and capabilities of the vehicle described. For example, a standard steering wheel and two-pedal configuration may be utilized, wherein an intention to rotate or tightly turn the vehicle may be inferred from a low or zero speed of the vehicle and a degree of turn in the steering wheel. Push buttons, video touch screens, voice recognition, or other similar methods may be employed to engage or confirm operation of the vehicle according to methods described herein. The methods employed herein may be utilized in automated vehicle applications, for example, with the operator simply selecting a destination and programming in the vehicle or in an infrastructure system controlling the vehicle to the destination, according to methods known in the art.

Figure 12:
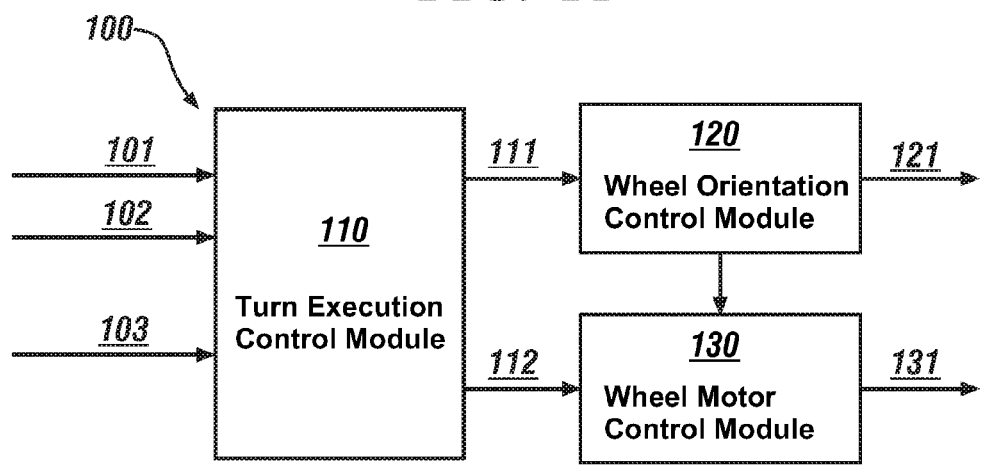
FIG. 12 schematically depicts an exemplary system for controlling a low speed turning maneuver, in accordance with the present disclosure.

FIG. 12 schematically depicts an exemplary system for controlling a low speed turning maneuver, in accordance with the present disclosure. System 100 includes a turn execution control module 110, a wheel orientation control module 120, and a wheel motor control module 130. Turn execution control module 110 monitors longitudinal vehicle speed 101, turning commands 102, and a spin envelope requirement 103. The spin envelope requirement 103 may include information such as lane geometries, presence of detected objects or tracked vehicles, or the spin envelope requirement 103 may be an output from a separate module processing such information and determining specific instructions to turn execution control module 110 based upon the processing. Turn execution control module 110 issues commands to wheel orientation control module 120 comprising a desired wheel configuration 111, and wheel orientation control module 120 generates wheel orientation commands 121 to control mechanisms steering or controlling orientation of each of the individually steerable wheels. Additionally, turn execution control module 110 issues commands to motor control module 130 comprising a desired turning maneuver 112, and wheel orientation control module 120 reports a wheel orientation status to wheel motor control module 130. Upon receiving a status indicating that the vehicle is configured to perform the desired turn maneuver, wheel motor control module 130 issues exemplary at-wheel motor commands 131 to the mechanisms providing motive force to the driven wheels in accordance with the desired turn maneuver. In this way, input may be monitored and processed to control a desired turn maneuver. It will be appreciated that the above steps may be executed within an exemplary low speed turning maneuver module, wherein such a module may exist as a separate device, may exist as a sub-function of device with other processes, or may exist across a plurality of physical devices.

Figure 13:
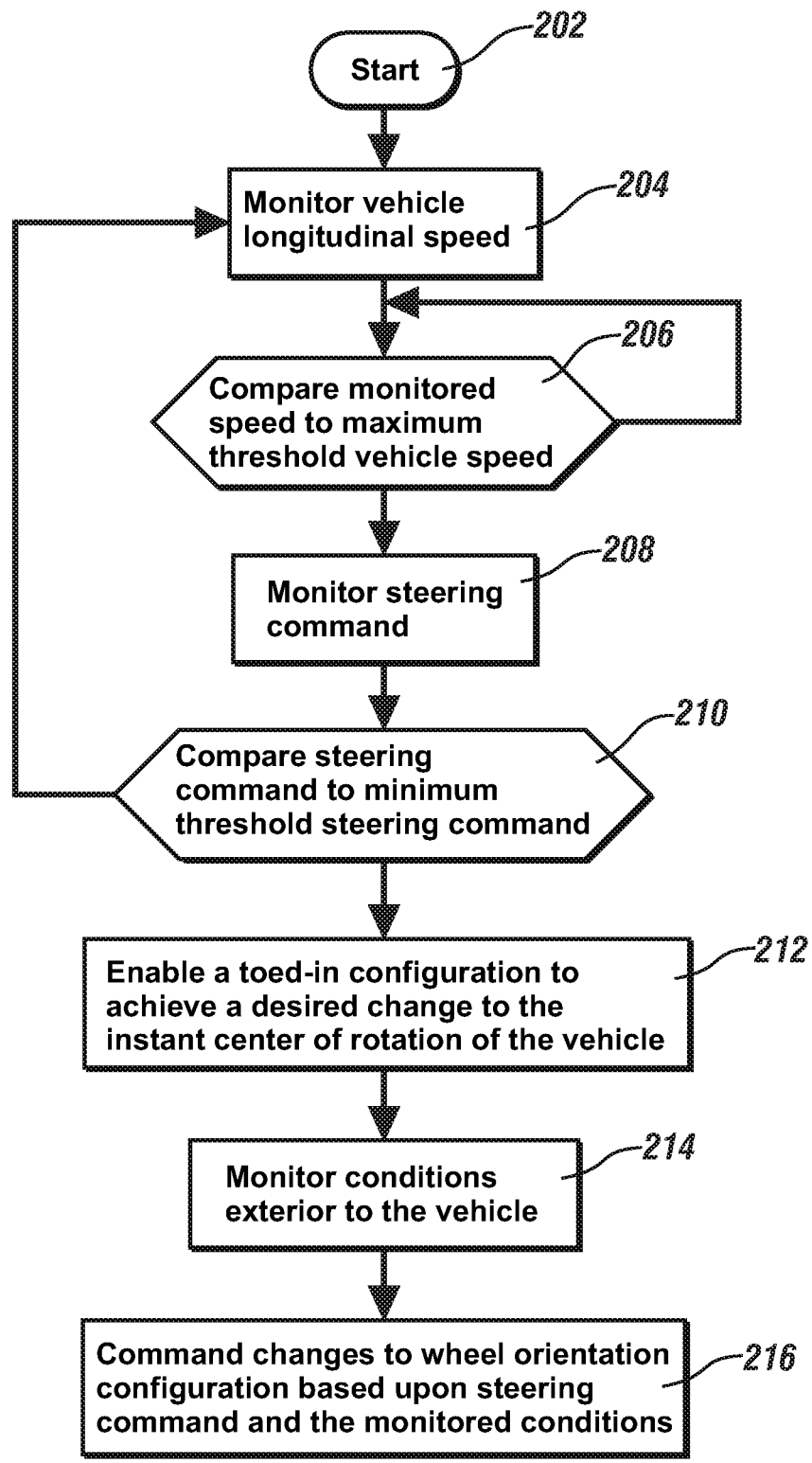
FIG. 13 depicts an exemplary process for activating a low speed turning maneuver, in accordance with the present disclosure.

FIG. 13 depicts an exemplary process for activating a low speed turning maneuver, in accordance with the present disclosure. Such a low speed turning maneuver may include a low speed zero slip turning maneuver as described herein. Process 200 begins with step 202. At step 204, the longitudinal speed of the vehicle is monitored. At step 206, the monitored speed is compared to a threshold vehicle speed. If the vehicle speed is above the threshold vehicle speed, the process returns to step 204 to continue monitoring the vehicle speed. If the vehicle speed is below the threshold vehicle speed, the process continues to step 208, wherein a steering command is monitored. At step 210, the steering command is compared to a threshold steering command, determining whether the commanded turn may be accomplished through minor adjustments according to conventional steering methods or the commanded turn warrants a low speed turning maneuver including a tight spin envelope according to methods described herein. If the turn command does not reach a threshold warranting a low speed turning maneuver, then the system returns to step 204. If the turn command does reach a threshold warranting a low speed turning maneuver, then the process advances to step 212 wherein the operation of the vehicle is changed to enable a toed-in configuration in accordance with methods described herein to achieve a desired change to the instant center of rotation of the vehicle. At step 214, conditions exterior to the vehicle are monitored including sensed objects and lane geometry in the proximity of the vehicle. At step 216, changes to wheel orientation configuration are commanded based upon the steering command and the monitored sensed objects and lane geometry.

Vehicles utilizing the methods described herein may be operated in standard lanes of travel with other vehicle not similarly employing the present methods It will be appreciated that benefits may be realized if vehicles equipped to operate methods described herein are utilized together in dedicated lanes, allowing tighter turning radii and narrower lanes than conventional traffic.

At-wheel motors are known in the art and include electric machines capable of utilizing stored or produced electrical energy to provide motive force to the connected wheel. In the alternative, a central electric machine or electric machine may be utilized, providing a transmission device known in the art capable of providing selective connection between the electric machine and the wheels to be driven. Transmission devices are known to include selectably reversible output torque directions to a wheel based upon a given input torque to the transmission. A number of propulsive configurations are envisioned, and the disclosure is not intended to be limited to the particular embodiments described herein.

Suspension devices are known in a number of configurations for use on wheels such as in the configurations described herein. In configurations utilizing fixed wheel orientations, a leaf spring design may be utilized to provide a shock absorbing function and sustain performance of the vehicle over uneven road conditions. Where a wheel in a front row of wheels or in a rear row of wheels may be steered, known configurations including shock absorbers may be utilized. A number of known configurations to provide suspension to wheels of a vehicle are envisioned, and the disclosure is not intended to be limited to the particular embodiments described herein.

Steering mechanisms for use in vehicles described herein are envisioned in a number of known configurations. For example, steering may be accomplished through use of a hydraulic steering pump or pumps controllably connected to pistons actuating individual wheels or groups of wheels according to methods described herein. In an exemplary configuration, the front wheels could be connectably controlled with a single piston, with the piston driving a common toed in angle for both of the front wheels. In another configuration, electric motors or servos may be used to steer some or all of the wheels according to methods known in the art. A number of steering configurations are envisioned, and the disclosure is not intended to be limited to the particular embodiments described herein.

Braking mechanisms for use in vehicles described herein are envisioned in a number of known configurations. For example, disc brakes are one preferable method, wherein brake rotors and pads may be utilized in known configurations to apply braking force to wheels on the vehicle. Drum brakes are another form of braking device known in the art. Additionally, the electric machine or machines of the vehicle may be operated in reverse or as regenerative brakes, converting the mechanical energy in the braking effort to provide energy to the vehicle energy storage device. Additionally, a combination of these methods may be utilized. Anti-lock braking methods and horizontal stability control methods may be employed as are known in the art. It will be appreciated that a number of best braking practices are known in the art and may be employed to improve braking in the vehicle. A number of braking configurations are envisioned, and the disclosure is not intended to be limited to the particular embodiments described herein.

One having skill in the art will appreciate that all-wheel steering systems are known, including methods wherein front and rear wheels are coordinated depending upon vehicle speed. In one exemplary configuration, at low speeds, the front wheels and rear wheels are oriented in opposite directions to facilitate parking. For example, if both front wheels are pointed to the left, then both rear wheels will be pointed to the left. In the same configuration, at high speeds, all wheels are pointed in the same direction to facilitate lane changes. In some exemplary methods, the orientation of wheels in these maneuvers are controlled with application of a speed dependant gain, wherein a set of wheels are controlled independently, and the other set of wheels are controlled dependently utilizing the gain. It will be appreciated that these method may be used interchangeably with the methods disclosed herein depending upon the maneuver desired by the operator or appropriate based upon the context of vehicle operation and the surroundings of the vehicle.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. A control module may have a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Apparatus to turn a vehicle in a low speed zero slip turning maneuver, comprising:
    a vehicle body;
    a vehicle chassis comprising:
        a plurality of wheels, wherein every wheel of the chassis is steerable; and
        an electric propulsion system; and
    a low speed turning maneuver module:
        monitoring a desired low speed zero slip turning maneuver, comprising:
            monitoring a road geometry proximate to the vehicle;
            determining a projected path of travel based upon the road geometry; and
            determining the desired low speed zero slip turning maneuver based upon the projected path of travel;
        projecting a plurality of desired instant centers of rotation for the vehicle based upon the desired low speed zero slip turning maneuver;
        for each of the desired instant centers of rotation, determining a wheel orientation for each of the wheels perpendicular to the desired instant center of rotation; and
        controlling each of the wheels according to the corresponding determined wheel orientations.

2. The apparatus of claim 1, wherein the low speed zero slip turning maneuver module monitoring the desired low speed zero slip turning maneuver further comprises:
    monitoring a steering command;
    comparing the steering command to a threshold steering command; and
    determining the desired low speed zero slip turning maneuver further based upon the comparing.

3. The apparatus of claim 1, wherein the low speed turning maneuver module monitoring the desired low speed zero slip turning maneuver further comprises:
    monitoring a sensed object proximate to the vehicle; and
    determining the desired low speed zero slip turning maneuver further based upon the sensed object.

4. The apparatus of claim 1, wherein the chassis and the body form a substantially planar interface, with components of each the chassis and the body substantially not violating the planar interface.

5. The apparatus of claim 1, wherein the chassis and the body form a plurality of substantially planar interfaces, with components of each the chassis and the body substantially not violating the planar interfaces.

6. The apparatus of claim 1, wherein projecting the plurality of desired instant centers of rotation comprises dynamically determining the desired instant center of rotation for the vehicle throughout the desired low speed zero slip turning maneuver.

7. The apparatus of claim 1, wherein the low speed turning maneuver module monitoring the desired low speed zero slip turning maneuver comprises the low speed turning maneuver module monitoring a desired stationary rotation of the vehicle; and
    wherein the low speed turning maneuver module projecting the plurality of desired instant centers of rotation comprises the low speed turning maneuver module determining one of the desired instant centers of rotation corresponding to the desired stationary rotation to be at the geometric center of the vehicle.

8. The apparatus of claim 1, wherein at least one of the plurality of wheels is attached to an at-wheel motor.

9. Method to turn a vehicle in a low speed zero slip turning maneuver using a low speed turning maneuver module comprising:
    monitoring a road geometry proximate to the vehicle;
    determining a projected path of travel based upon the road geometry;
    projecting a plurality of desired instant centers of rotation for the vehicle based upon the projected path of travel;
    for each of the desired instant centers of rotation, determining a wheel orientation for each of the wheels perpendicular to the desired instant center of rotation; and
    controlling each of the wheels according to the corresponding determined wheel orientations.

10. The method of claim 9, wherein determining a projected path of travel comprises:
    monitoring GPS data;
    determining an approximate vehicle location within a 3D map database based upon the GPS data;
    monitoring localizing features proximate to the vehicle;
    localizing a precise vehicle location based upon the localizing features; and
    determining the projected path of travel based upon the localized precise vehicle location.

11. The method of claim 9, wherein projecting the desired instant centers of rotation for the vehicle based upon the projected path of travel comprises:
    determining a desired vehicle travel envelope based upon the projected path of travel and a geometry of the vehicle; and
    projecting the desired instant centers of rotation based upon the desired vehicle travel envelope.

12. Method to turn a vehicle in a low speed zero slip turning maneuver using a low turning maneuver module comprising:
    monitoring a steering command;
    monitoring enablement of a low speed zero slip turning maneuver mode;
    comparing the steering command to a threshold steering command;
    determining a desired low speed zero slip turning maneuver, comprising:
        monitoring a road geometry proximate to the vehicle;
        determining a projected path of travel based upon the road geometry;
        determining the desired low speed zero slip turning maneuver based upon the projected path of travel, the comparing and the enablement of the low speed zero slip turning maneuver mode;
    projecting a plurality of desired instant centers of rotation for the vehicle based upon the desired low speed zero slip turning maneuver;

for each of the desired instant centers of rotation, determining a wheel orientation for each of the wheels perpendicular to the desired instant center of rotation; and controlling each of the wheels according to the corresponding determined wheel orientations.

13. The method of claim 12, further comprising:

monitoring a sensed object proximate to the vehicle; and determining the desired low speed zero slip turning maneuver further based upon the sensed object.

14. The method of claim 12, wherein monitoring a steering command comprises:

monitoring vehicle to infrastructure communication comprising autonomous instructions from a parking facility.

* * * * *